United States Patent [19]

Hawkins et al.

[11] Patent Number: 4,730,764
[45] Date of Patent: Mar. 15, 1988

[54] ULTRASONIC WELDING WIRE TERMINATION APPARATUS

[75] Inventors: Rodney H. Hawkins, Orange; Mark W. Dearth, Milford; Michael J. Patrikios, Stratford, all of Conn.

[73] Assignee: American Technology, Inc., Milford, Conn.

[21] Appl. No.: 34,848

[22] Filed: Apr. 6, 1987

[51] Int. Cl.[4] .......................... B23K 1/06; B23K 3/00
[52] U.S. Cl. ..................................... 228/1.1; 228/4.5; 228/6.2; 228/44.7
[58] Field of Search .............. 228/1.1, 4.5, 6.2, 44.7, 228/110

[56] References Cited

U.S. PATENT DOCUMENTS

| | | | |
|---|---|---|---|
| 3,053,124 | 9/1962 | Balamuth et al. | 228/1.1 |
| 3,106,856 | 10/1963 | Jones et al. | 228/1.1 |
| 3,128,649 | 4/1964 | Avila et al. | 228/1.1 |
| 3,328,610 | 7/1964 | Jacke et al. | 228/1.1 |
| 3,360,850 | 1/1968 | Avila et al. | 228/1.1 |
| 3,444,612 | 5/1969 | Pennings | 228/1.1 |
| 3,602,421 | 8/1971 | Spratt | 228/1.1 |
| 3,654,041 | 4/1972 | Wysong | 156/580 |
| 3,791,028 | 2/1974 | Missel | 228/1.1 |
| 4,032,382 | 6/1977 | Obeda | 228/1.1 |
| 4,139,140 | 2/1979 | Stockel | 228/110 |
| 4,596,352 | 6/1985 | Knapp | 228/1.1 |

Primary Examiner—Nicholas P. Godici
Assistant Examiner—Samuel M. Heinrich
Attorney, Agent, or Firm—Kramer, Brufsky & Cifelli

[57] ABSTRACT

Apparatus for ultrasonically welding a wire to a wire terminal. A stationary anvil forms the lower horizontal wall of a work chamber into which a wire workpiece is inserted. The vertical walls of the work channel are formed by the walls of a slot in a relatively movable horizontal support plate cantilevered from a base. The slot in the support plate fits about the anvil. The horizontal support plate is oscillatable to swing vertically thereby adjusting the size of the work channel. A terminal is seated on the support plate and covers the chamber. An ultrasonic welding tip contacts the terminal and forces down the support plate so as to maintain very tight spot contact between the wire on the anvil and the terminal, against the flexure of the cantilevered arm. Welding of the wire to the terminal is effected by the ultrasonic vibration of the welding tip against the terminal. As the wire is tightly confined in the work channel, no spreading or splaying will occur while the wire is in a plastic-like state, and the spot weld precisely locates the wire end on the terminal.

8 Claims, 4 Drawing Figures

ULTRASONIC WELDING WIRE TERMINATION APPARATUS

BACKGROUND OF THE INVENTION

1. Field of Invention

This invention relates to an apparatus for ultrasonically welding the terminal end of a metal wire to a metallic wire terminal.

2. Description of the Prior Art

The end of a metal wire may be ultrasonically welded to a metal terminal by placing the wire firmly against the terminal between an anvil and an ultrasonic welding tip and applying ultrasonic energy to the wire. The energy should be applied so that the tip vibrates the pieces to be welded, to intermolecularly bond the metal workpieces one to another.

Methods of generation of ultrasonic vibration are well known in the prior art (e.g., U.S. Pat. Nos. 3,053,124; 3,328,610; 3,444,612; and 3,602,421). A typical frequency of vibration may be twenty thousand cycles per second.

However, as the wire end to be welded to the metallic wire terminal may be in a plastic state during the welding process and therefore spread or splayed, it is important that a compression chamber be formed tightly around the wire end during the welding process. This comparison chamber should be formed by elements that are preferably spring-loaded, thereby maintaining localized spot pressure of the wire end against the terminal during and throughout the welding process to prevent the wire end from splaying along the terminal even though confined within the compression chamber. The prior art is deficient in providing such a device.

SUMMARY OF THE INVENTION

In accordance with the instant invention, ultrasonic welding of a wire terminal is carried out by a stationary anvil having a horizontal serrated worksurface slightly wider than the diameter of the wire to be welded to a terminal. A compression chamber is formed by the horizontal worksurface and the surrounding walls of a slot in a relatively movable wire terminal support structure. This support structure is cantilevered and spring-loaded so as to oscillate or swing vertically but with negligible horizontal play or sideways movement. The support is machined such that the slot has a sufficiently small tolerance around the anvil so as to form the compression chamber, but with sufficient tolerances to allow the support to swing vertically. The wire workpiece is placed into the chamber and a metal wire terminal is placed in a seat on the oscillatable support structure over the anvil and slot in the support structure thereby closing the compression chamber. An ultrasonic welding tip is placed on the metal wire terminal seated on the movable support structure, which is in turn over the wire workpiece on the stationary anvil. The tip presses down the wire terminal, against the bias of the spring-loading of the support structure, and brings the metal wire terminal into tight spot contact with the stationary wire workpiece in the compression chamber. The pressure on the tip and apparatus is maintained while welding, thus precluding spreading or splaying of the end of the wire on the terminal. Welding is effected by ultrasonically vibrating the tip.

In some terminal applications, more latitude may be given in effecting the weld. Accordingly, an alternate embodiment of this invention uses a spring-loaded anvil upon which the wire terminal is placed. The end of the wire to be terminated is placed on the terminal and confined laterally by support elements placed on the terminal, on either side of the wire end. The spacing of the support elements is such that the wire end is tightly confined in the lateral direction to minimize splaying laterally, but precision spot welding is not a requirement. The spacing of the support elements is in strict tolerance with the width of a welding tip which is inserted therebetween forming a tight compression chamber about the wire end to prevent it from spreading or splaying on the terminal during welding. Welding is effected by ultrasonically vibrating the tip parallel to the longitudinal axis of the wire workpiece.

BRIEF DESCRIPTION OF DRAWINGS

Further objects and advantages of the invention will become apparent from the following description and claims, and from the accompanying drawings, wherein:

FIG. 4 is a cross-sectional view of an alternative embodiment of the apparatus of the invention.

DETAILED DESCRIPTION OF THE PREFERRED EMBODIMENT

Figure 1:
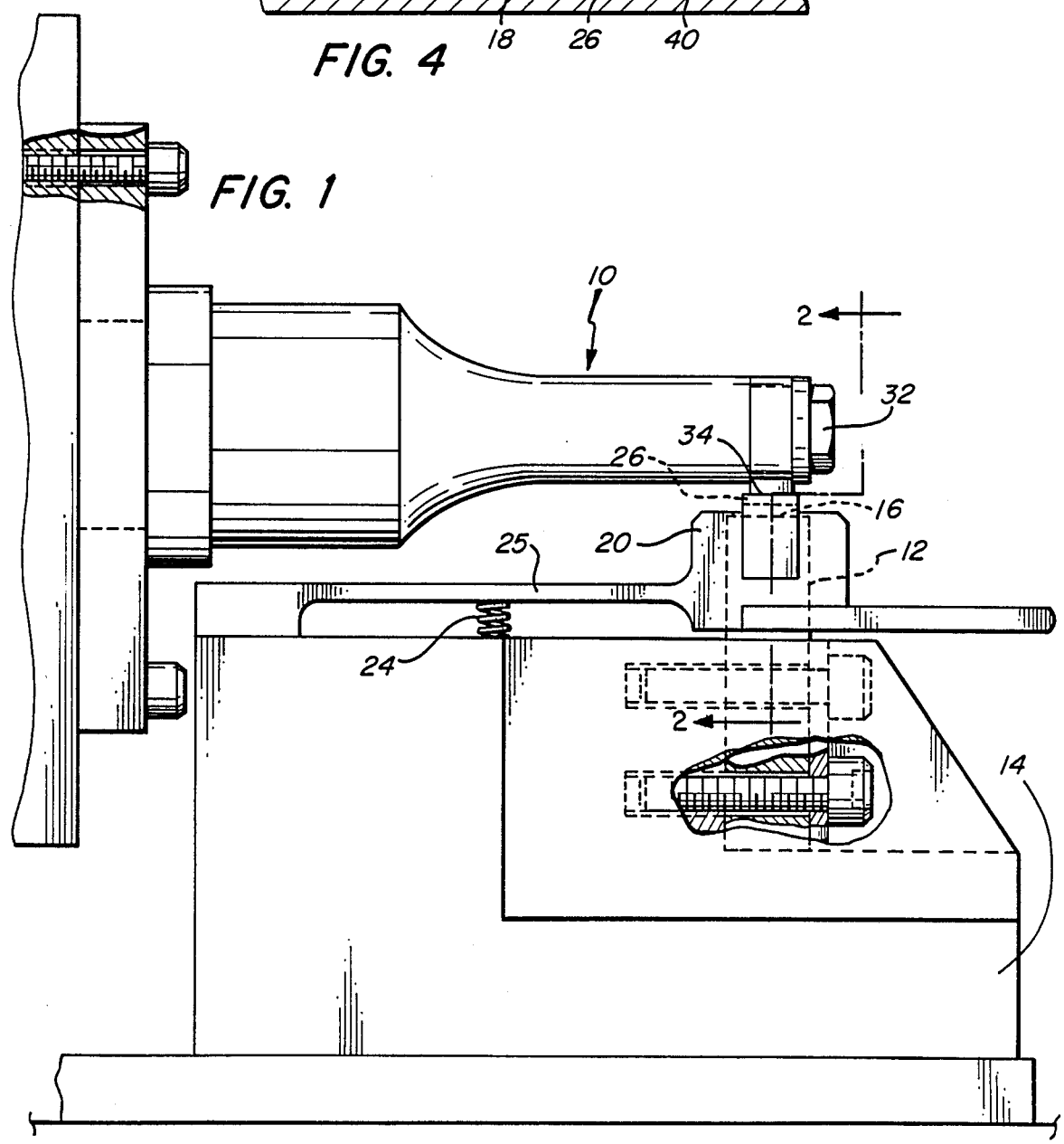
FIG. 1 is a side view in elevation of the preferred embodiment of the apparatus of the present invention.
Figure 2:
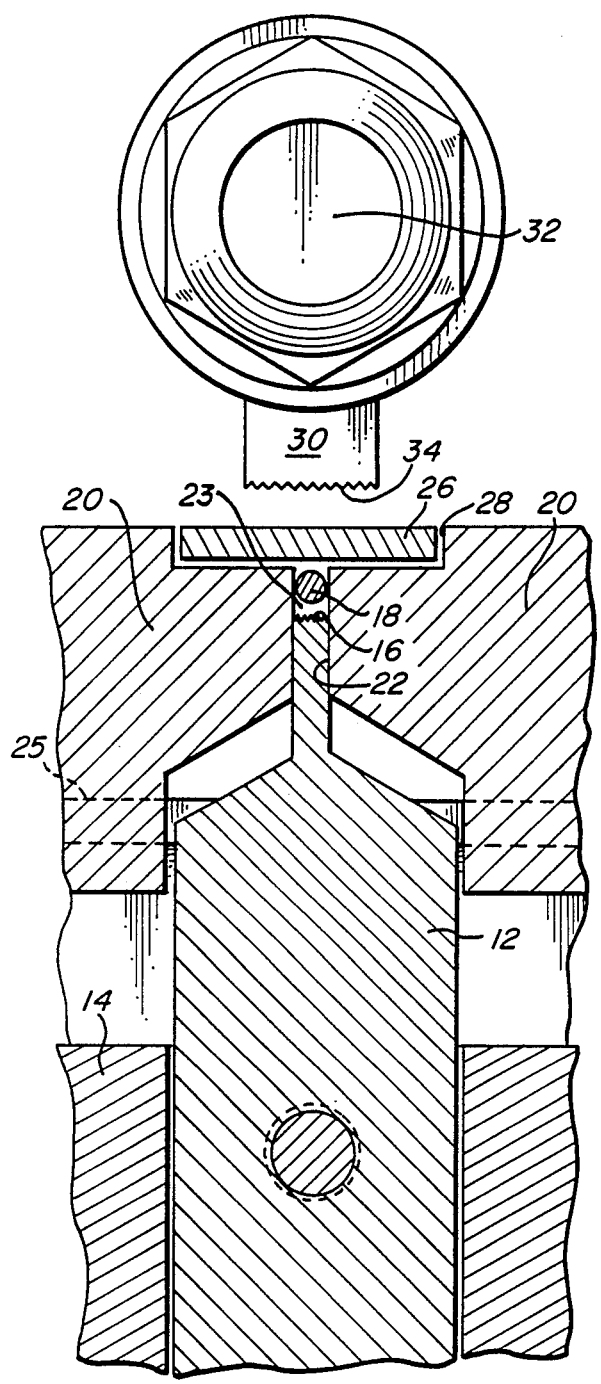
FIG. 2 is a cross-sectional view taken substantially along the plane indicated by line 2—2 of FIG. 1 with the welding tip separated from the support structure and the support structure is in its fully elevated position.
Figure 3:
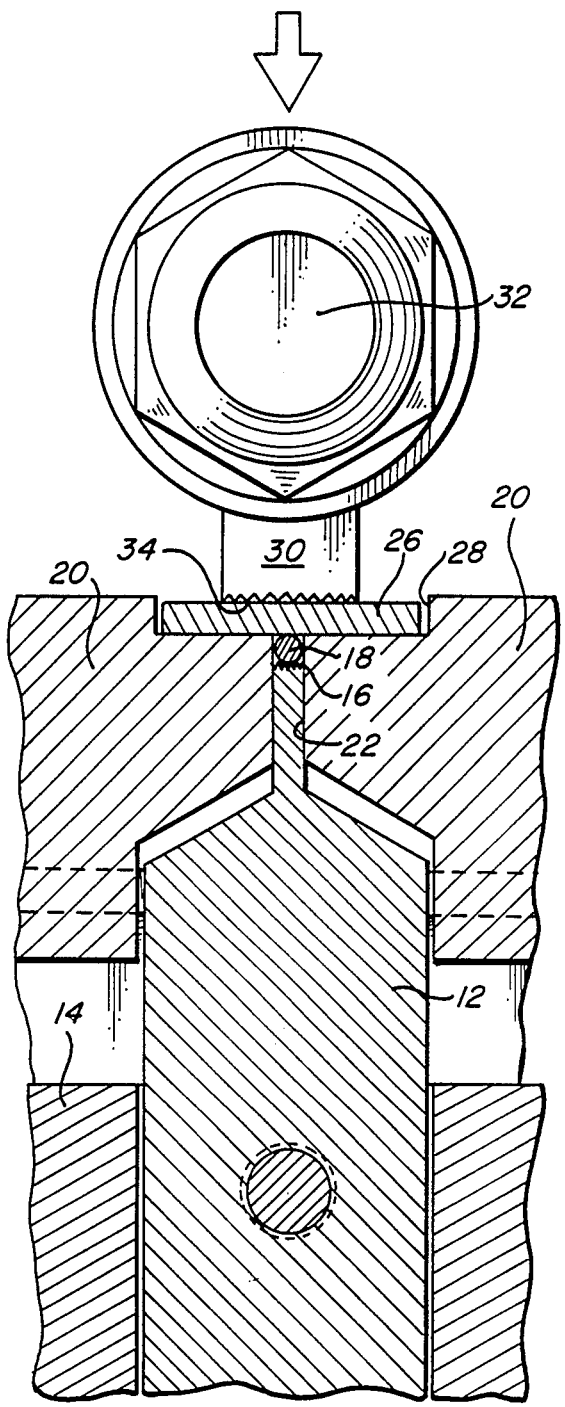
FIG. 3 is a view similar to FIG. 2 with the welding tip pressed against the support structure, thereby depressing the support structure to bring a wire end into spot contact with a wire terminal seated on the support structure.

Referring now to the drawings in detail, wherein like elements are indicated by like numerals throughout the several views, a preferred embodiment of the apparatus 10 of the present invention is illustrated in FIGS. 1 to 3 and includes a stationary anvil 12 which is firmly attached to a base 14. The anvil 12 has a horizontal serrated worksurface 16 which is somewhat wider than a wire workpiece 18 to be welded to a wire terminal 26.

A wire terminal support plate 20 has an elongated slot 22 of the approximate width of horizontal serrated worksurface 16 on the anvil 12. The support plate 20 is positioned so that the anvil 12 extends partially into the slot 22 thereby forming an open chamber 23 which serves as a work area for the wire workpiece 18. The slot 22 is machined so as to tightly fit around the anvil 12 with sufficient clearance to permit some pivotable movement of support plate 20 and slot 22 relative to the anvil.

The support plate 20 is rigidly fastened at one end to the base 14, yet is cantilevered at the end on arm 25 so as to be oscillatable in a vertical direction without substantial horizontal movement, thereby changing the height of the open chamber 23 by changing the relative inserted position of the stationary anvil 12 in the slot 22 of the movable support plate 20, enabling slightly different sized wires within the tolerances of the open chamber 23 to be inserted in open chamber 23 and welded to wire terminal 26. A spring 24 may be fixed between the base 14 and the cantilevered arm 25 carrying support plate 20 so as to dampen the flexibility of the support plate 20 with respect to the base 14.

After the wire workpiece 18 is inserted into the open chamber 23 formed by the anvil 12 and the slot 22 in the support plate 20, the wire terminal 26 is placed into a seat 28 in the front of support plate 20 thereby covering the open chamber 23 and forming a compression chamber, as shown in FIG. 2. The ultrasonic welding tip 30 is then brought to bear against the wire terminal 26, as shown in FIG. 3. The ultrasonic welding tip 30 is presses down the wire terminal 26 and support plate 20 against the bias of spring 24 and the cantilevering of arm 25 so as to tightly spot hold the wire workpiece 18 between the anvil 12 and the wire terminal 26.

Welding of the wire workpiece is effected by the ultrasonic horn 32 vibrating the tip 30 at a frequency of twenty kilohertz parallel to the top surface of terminal 26. The worksurface 34 of the tip 30 is serrated so as to firmly grip the wire terminal 26 and thereby efficiently transmit the ultrasonic energy.

Because of the confinement of the wire 18 in the compression chamber against the flexure of cantilevered arm 25 and bias of spring 24, splaying or spreading of the wire on the terminal is precluded, with spot, precise location of the wire on the terminal.

In some terminal applications, more latitude may be given in effecting the weld. Accordingly, in an alternate embodiment of the invention, illustrated in FIG. 4, a spring-loaded anvil 40 can be provided upon which the wire terminal 26 is placed. Anvil 40 can constitute a cantilevered arm and spring as shown in FIG. 1. The end of the wire 18 to be terminated is placed on the terminal 26 and confined laterally by support elements 42, 44 placed on the terminal 26, on either side of the wire end 18. The spacing of the support elements is such that the wire end is tightly confined in the lateral direction in a compression chamber to minimize splaying laterally. The spacing of the support elements 42, 44 is in strict tolerance with the width of a welding tip 30 which is inserted therebetween forming a tight compression chamber 23 about the wire end to prevent it from spreading or splaying on the terminal during welding. Welding is effected by ultrasonically vibrating the tip parallel to the longitudinal axis of the wire workpieces as in the embodiment of FIGS. 1 to 3.

What is claimed is:

1. An ultrasonic welding apparatus adapted to weld the terminal end of a wire to a wire terminal, comprising:
   an ultrasonic horn;
   an ultrasonc welding tip attached to said horn;
   a base;
   an anvil attached to said base;
   chamber means disposed between said horn and said anvil, said chamber means including a chamber being adapted to receive said terminal end of a wire;
   seat means disposed at one end of said chamber adapted to receive said wire terminal; and
   elastic means associated with said chamber means for adjusting the size of said chamber during ultrasonic welding whereby the terminal end of a wire maintains a tight contact with the wire terminal.

2. The apparatus of claim 1 wherein said chamber means includes a support structure having said chamber extending therethrough.

3. The apparatus of claim 2 wherein said seat means is disposed in said anvil whereby the chamber is adapted to be closed at one end by the wire terminal and at the other end by application of the ultrasonic welding tip.

4. The apparatus of claim 3 wherein said elastic means includes a cantilevered arm connecting said anvil to said base, said cantilevered arm providing structural elastic flexibility of said anvil with respect to said base.

5. The apparatus of claim 4 wherein said elastic means includes spring means between said cantilevered arm and said base to dampen the flexibility of the anvil with respect to said base.

6. The apparatus of claim 3 wherein said seat means is disposed in said support structure whereby the chamber is adapted to be closed at one end by application of the anvil and at the other end by the wire terminal.

7. The apparatus of claim 4 wherein said elastic means includes a cantilevered arm connecting said support structure to said base, said cantilevered arm providing structural elastic flexibility of said support structure with respect to said base.

8. The apparatus of claim 7 wherein said elastic means includes spring means between said cantilevered arm and said base to dampen the flexibility of the support structure with respect to said base.

* * * * *

UNITED STATES PATENT AND TRADEMARK OFFICE
CERTIFICATE OF CORRECTION

PATENT NO. : 4,730,764
DATED : March 15, 1988
INVENTOR(S) : Rodney H. Hawkins et al.

It is certified that error appears in the above-identified patent and that said Letters Patent is hereby corrected as shown below:

In Claim 6, COlumn 4, line 33 of the patent, change "3" to -- 2 --.

Signed and Sealed this

Eighteenth Day of October, 1988

*Attest:*

DONALD J. QUIGG

*Attesting Officer*   *Commissioner of Patents and Trademarks*